Feb. 19, 1946.     G. E. THOMPSON     2,395,355
HYDRAULIC DRIVE UNIT
Filed Aug. 28, 1943     2 Sheets-Sheet 1

INVENTOR
Geo. E. Thompson
BY
ATTYS

Feb. 19, 1946.　　　G. E. THOMPSON　　　2,395,355
HYDRAULIC DRIVE UNIT
Filed Aug. 28, 1943　　　2 Sheets-Sheet 2

INVENTOR
Geo. E. Thompson
BY
ATTYS

Patented Feb. 19, 1946

2,395,355

UNITED STATES PATENT OFFICE 2,395,355

HYDRAULIC DRIVE UNIT

George E. Thompson, Stockton, Calif.

Application August 28, 1943, Serial No. 500,355

10 Claims. (Cl. 192—60)

This invention relates to a hydraulic drive mechanism, my principal object being to provide a unit of this character particularly adapted for motor vehicle use, which eliminates the need of a clutch and which, when coupled together as a pair in a certain manner, takes the place of the usual differential mechanism, as well as a clutch.

Another object is to provide a unit of this nature which is small and compact for the power developed, and thus is capable of being mounted in direct connection with each wheel of the vehicle within the brake drum, thus giving an individual differentiated drive for each wheel to which the unit is applied and without increasing the size of the brake drum and other adjacent standard size parts.

A further object is to construct the unit in such a manner that the oil pressure developed with the operation of this unit is confined within the body of the unit, only in certain small areas thereof. Thus, while the unit is necessarily enclosed in an oil retaining housing, such housing does not require pressure tight packings about the rotating members connected to the unit and which project from the housing.

The unit is also so constructed that wear is reduced to a minimum, so that the unit will give a long and efficient service without repair or replacement of parts being necessary.

A further object of the invention is to produce a simple, inexpensive device and yet one which will be exceedingly effective for the purpose for which it is designed.

These objects I accomplish by means of such structure and relative arrangement of parts as will fully appear by a perusal of the following specifications and claims.

In the drawings similar characters of reference indicate corresponding parts in the several views.

Figure 1:
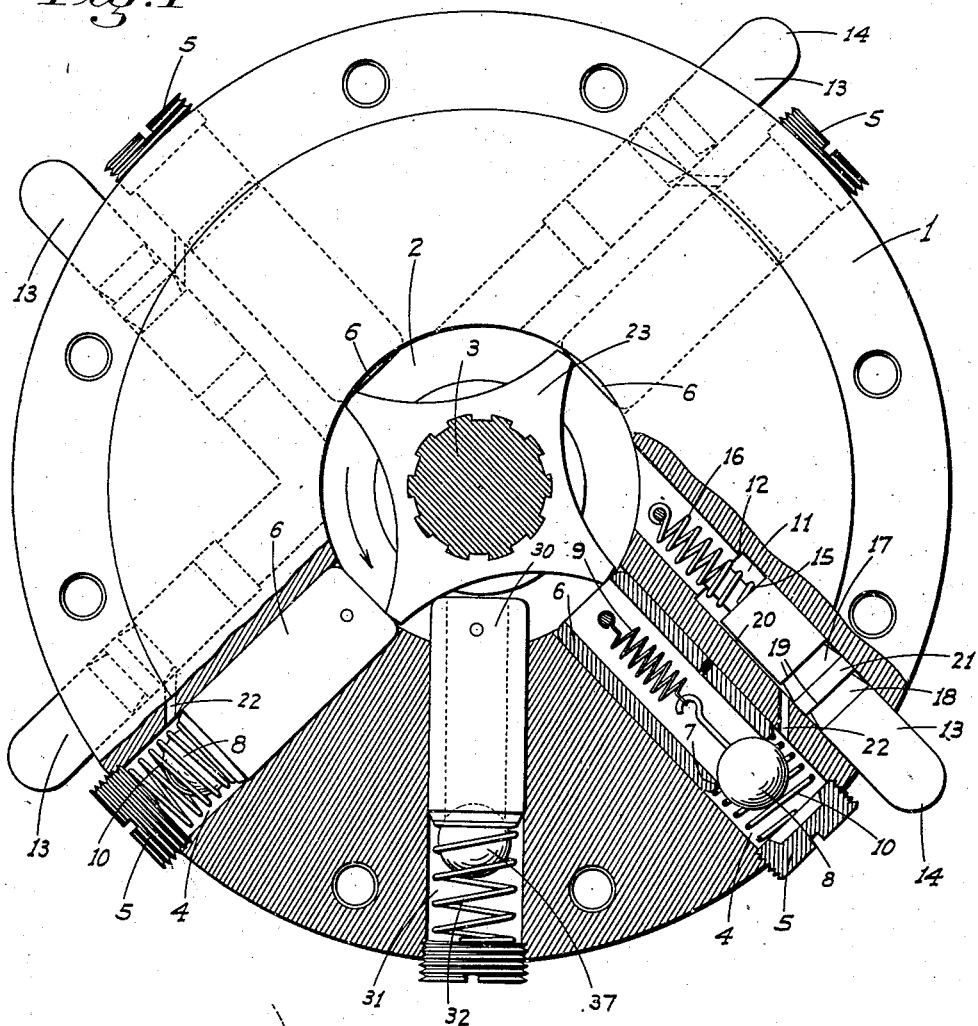
Figure 1 is a side elevation of my improved unit with the driving or driven member detached therefrom and partly in section to show the pumping mechanism, the pump plungers and flow control valves being in their outermost position.

Referring now more particularly to the numerals of reference on the drawings, the unit comprises a cylindrical disc like body 1, having a central opening 2 of considerably larger size than the axial shaft 3 which projects into the opening.

Formed in the body are a number of radially disposed cylinders 4 which are grouped evenly about the body. The cylinders are initially open at both ends, to the opening 2 and to the outer periphery of the body, being closed at the latter end by plugs 5. A tubular plunger 6 is mounted in each cylinder, each plunger at its outer end being formed with a valve seat 7 normally engaged by a ball check valve 8 which is held against the seat by a light tension spring 9. The plunger is yieldably depressed in the cylinder (or advanced toward the opening 2) by a compression spring 10 disposed between the outer end of the plunger and the plug 5. This spring is stronger than tension spring 9 and is disposed so that it does not interfere with the valve movement.

Disposed alongside each cylinder 4 is a cylindrical passage 11 extending through the body through the opening 2 to its outer periphery and formed intermediate its ends with an annular shoulder 12 facing away from the opening 2. A flow-control plunger type valve 13 is slidable in the passage 11 radially out from the shoulder 12 and projecting from the periphery of the body with a preferably rounded head 14 on its outer end. The inner end of the valve is formed as a flat surface 15 to closely seat against the shoulder 12. The valve is normally advanced radially out so that the surface 15 clears the shoulder 12 a considerable distance by a compression spring 16 within the passage 11.

Intermediate its ends the valve 13 is formed with a pair of circular axially spaced grooves 17 and 18 of gradually increasing depth so as to form abrupt shoulders 19 on one side facing radially out. Between the inner groove 17 and the surface 15 the valve is cut down along its periphery to form an oil escape passage 20. The land 21 between the grooves, however, closely fits the passage 11.

Figure 2:
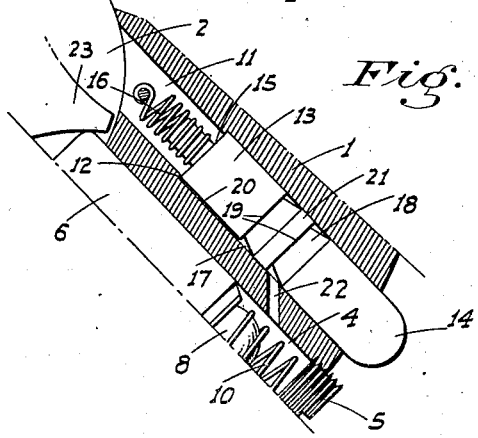
Figure 2 is a fragmentary sectional elevation showing a flow control valve at its inner position.

A port 22 is cut in the body 1 to establish communication between each cylinder 4 and the corresponding passage 11. This port is so positioned that its cylinder end is radially out from the plunger 6 when the latter is in its outermost position, while the other end of the port registers with the groove 17 when the valve 13 is in its outermost position as shown in Figure 1. The space between the grooves 17 and 18 relative to the possible depressing movement of the valve 13 from its outermost position is such that when the valve surface 15 seats against the shoulder 12, the port 22 registers with the outer groove 18 as shown in Figure 2.

To move the plungers radially out against the resistance of the springs 10, a star cam 23, having as many points as there are plungers, is disposed in the opening 2 and is secured on the shaft 3. This shaft is journaled in the body on one side by means of a ball bearing 24 thereon which is seated in a boss 25 projecting from the corresponding side of the body (see Figure 4).

Figure 3:
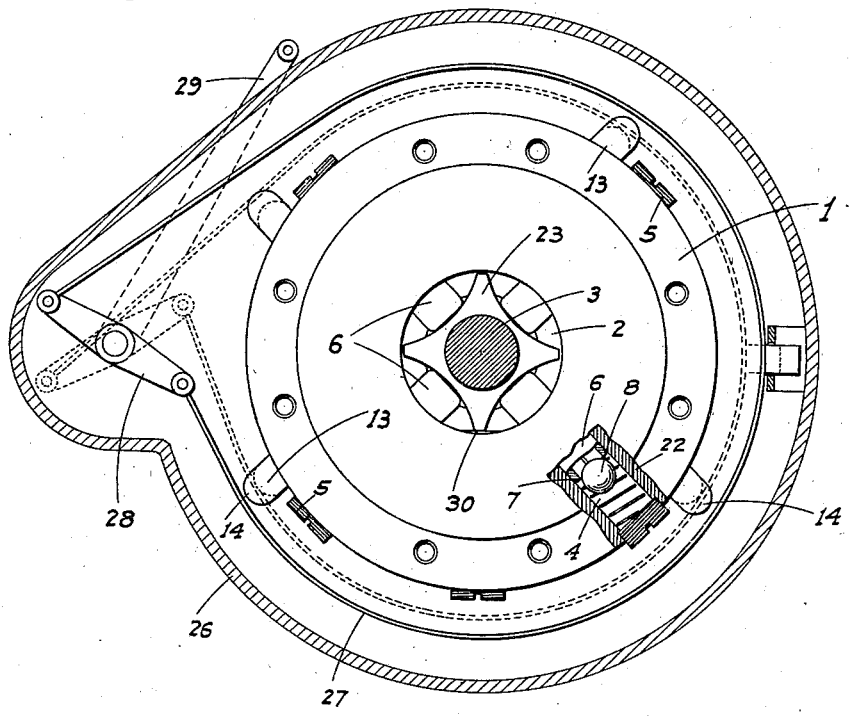
Figure 3 is a side elevation of the unit showing the pump plungers at their inner position and manually activated means to depress the flow control valves.

By reason of the above construction, it will be seen that the plungers are simultaneously and successively depressed by the rotation of the cam relative to the body, forcing the plungers radially out against the spring resistance. When the plungers clear the cam points and are moved radially inward by the spring action, the ball checks 8 leave their seats 7, as shown in Figure 3, and admit oil into the cylinders radially out from the plungers from the interior of said plungers or from the opening 2. Upon outward movement of the plungers by the cam action, the balls become instantly reseated and the oil is forced from the cylinder through the ports 22 into the grooves 17 of the valves 13. The oil then travels through the passages 20 back into the opening 2 and into the housing 26 which encloses the body and which is filled with oil at least to the level of the top of opening 2. As long as the pumping speed, which depends on the relative speed of rotation of the body and shaft 3, does not exceed the carry-off capacity of the passages 20, the body and shaft may rotate relative to each other. When however, the relative rotating speed is increased, the volume of oil being pumped into the cylinder is greater than the capacity of the passages 20. As a result, the oil becomes trapped in the cylinders, the plungers cannot move out to let the cam pass by the same and the shaft and the body rotate together. The faster the initial relative speed of rotation of the parts, the quicker and more effective will be this driving action and the slippage between the body and shaft will be correspondingly lessened.

As the pressure within each cylinder increases and builds up, such pressure acts against the shoulder 19 of each valve groove 17 and tends to force the valve radially inward against the resistance of the spring 16. This in turn tends to move the land 21 across the port 22 and thus forms a positive closure, preventing escape of the oil from the cylinder. It will be noted that only the outer portions of the cylinder and the ports 22 are the pressure areas of the entire unit.

In order to shift the valve 13 all the way in so that the oil pressure will pass into the groove 18 from the ports 22 and thus positively prevent escape of oil from the cylinder except for any small leakage, I provide a flexible control band 27, disposed in the housing 26 about and in line with the valves 13, as shown in Figure 3. This band has separated ends similar to a brake band and which ends are connected to a rocking arm 28 mounted in the housing. This arm is adapted to be turned in a direction to cause the band to contract about the body and depress the valves 13 by suitable means such as a pull lever 29 disposed outside the housing and connected to the pivot of the rocking arm. The rounded ends 14 of the valves reduce the friction when contacting the band. Once the valves 13 are thus depressed, the contracting pressure on the band may be released since the oil pressure acting against the shoulders 19 of the grooves 18 prevents outward movement of the valves until the pressure becomes relieved by a relative reduction of speed of the body or shaft sufficient to enable the springs 16 to push the valves 13 out. By this arrangement, a practically direct positive drive connection can be maintained between the body and shaft with a lower shaft or body speed than would otherwise be necessary.

The points of the cam 23 are necessarily somewhat high and are spaced apart a considerable distance so as to allow a plunger stroke of appreciable length, and the plungers at their inner end or within the opening 2 are correspondingly spaced. In order to cushion the rotation of the cam as the points leave each plunger and before picking up the next plunger, and thus preventing a possible jerky movement, I provide another plunger 30, slidably mounted in the body between a pair of plungers 6. This plunger is mounted in a radial bore 31 in the body and is yieldably urged inwardly by a compression spring 32. By reason of this cushion or shock absorber plunger 30, which is advanced into the opening 2 when the adjacent plungers 6 are depressed, the sudden release of the cam after the points simultaneously leave the plungers 6, is cushioned and the cam is prevented from jerky or uneven rotation.

It will be noted that plunger 30 is also tubular, the bore being substantially but not perfectly closed by a ball check 37 during outward movement of the plunger. This provides a resistance against such outward movement, in addition to the spring pressure, and allows of a fast inward or return movement.

Figure 4:
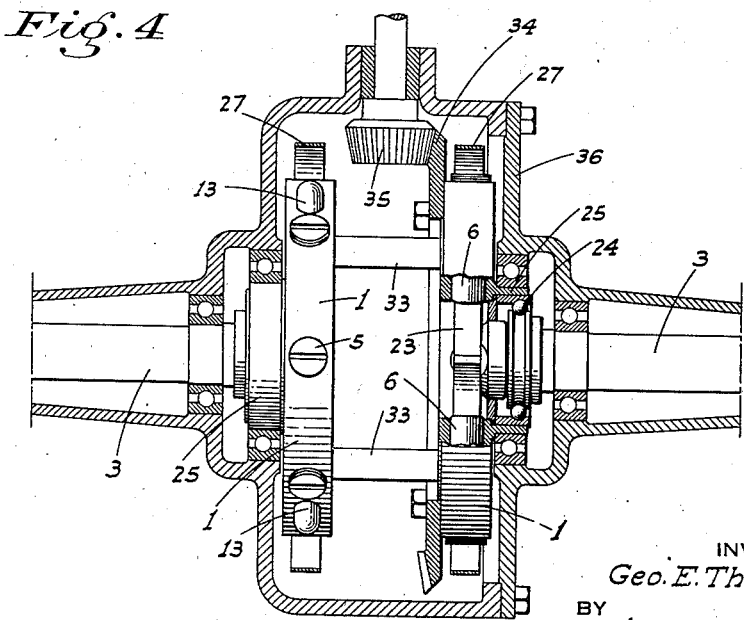
Figure 4 is an end view of a pair of the units as connected and mounted for use as a differential mechanism in a motor vehicle.

Either the body, itself, or the shaft 3, serves as a driving member depending on the installation of the unit. For instance if the unit is mounted in a wheel on a motor vehicle, the body is connected to the wheel and the shaft forms the drive member. If on the other hand, the units are arranged as a differential structure and connected between a pair of wheel axles, as is common practice in motor vehicles, one of the units forms the driving member and the shafts 3, which are the axles, become the driven members. In this arrangement, the two units are connected by suitable rigid ties 33 and the main drive gear 34 is mounted on the body of one unit. This gear is engaged by a drive pinion 35, the units together with the gear and pinion being enclosed in a conventional form of housing 36, in which the units and axles are journaled as shown in Figure 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A hydraulic drive unit comprising a rotatable body, a shaft turnable relative thereto, a fixed housing about the body adapted to contain a supply of oil, the body having a central opening about the shaft, a cylinder in the body radial with and open to said opening, a tubular plunger slidable in the cylinder, a check valve on the outer end of the plunger, a spring to move the plunger radially inward, a cam for the shaft to move the plunger radially out and means in the body forming a restricted oil outlet from the cylinder to the outer surface of the body.

2. A unit as in claim 1, with means included with said last named means to increase the restriction and functioning upon a build up of oil pressure within the cylinder as induced by an initial relative high rotative speed of the body and shaft.

3. A hydraulic drive unit comprising a rotatable body, a shaft turnable relative thereto, a fixed housing about the body adapted to contain a supply of oil, the body having a central opening about the shaft, a cylinder in the body radial with and open to said opening, a tubular plunger slidable in the cylinder, a check valve on the outer end of the plunger, a spring to move the plunger radially inward, a cam for the shaft to move the plunger radially out, means in the body forming a passage adjacent the cylinder and open at one end to the outer surface of the body, a slide valve in said passage, a spring urging the valve in a direction away from the open end of the passage, the valve having a circumferential groove therein and the body having a port establishing communication between the cylinder outwardly of the plunger and the passage at a point in the latter to register with the groove when the valve is in its initial spring-urged position; the valve having a restricted passage from said groove to the end of the valve adjacent the open end of the passage.

4. A unit as in claim 3, in which the groove is of increasing depth from one side to form an abrupt shoulder on the other side which faces in a direction away from the open end of the passage.

5. A unit as in claim 3, in which the valve is formed with another circumferential groove adapted to register with the adjacent end of the port when the valve is moved a predetermined distance in opposition to the spring.

6. A unit as in claim 3, in which the valve is formed with another circumferential groove adapted to register with the adjacent end of the port when the valve is moved a predetermined distance in opposition to the spring and manually controlled means to so move the valve.

7. A hydraulic drive unit comprising a rotatable body, a shaft turnable relative thereto, a fixed housing about the body adapted to contain a supply of oil, the body having a central opening about the shaft, a cylinder in the body radial with and open to said opening, a tubular plunger slidable in the cylinder, a check valve on the outer end of the plunger, a spring to move the plunger radially inward, a cam for the shaft to move the plunger radially out, means in the body forming a passage alongside the cylinder and open at one end to the central body opening, a slide valve in said passage, a spring urging the valve away from the open end of the passage, the valve having a circumferential groove therein and a restricted passage leading from said groove to the inner end of the valve; the body having a port establishing communication between the cylinder outwardly of the plunger and the passage at a point in the latter to register with the groove when the valve is in its initial spring-urged position.

8. A unit as in claim 7, in which the valve projects from the outer periphery of the body; and a manually activated member movable radially inward mounted in the housing in position to depress the valve when the member is thus moved whereby the groove will be shifted inwardly of the port and the latter closed.

9. A hydraulic drive unit comprising a rotatable body, a shaft turnable relative thereto, a fixed housing about the body adapted to contain a supply of oil, a pumping mechanism within the body to draw oil from the housing and return such oil to the housing thru a passage of restricted size, the body having a central opening into which the shaft projects and the pumping member including a pump plunger disposed substantially radially of the shaft and projecting into said opening, means to move the plunger radially inward, a cam on the shaft having a high point engageable with the plunger to move the same radially outward, a shock absorbing plunger slidably mounted in the body adjacent the pump plunger and projecting into the central opening into the path of the cam and yieldable means acting on said shock absorbing plunger moving the same radially inward.

10. A hydraulic drive unit comprising a rotatable body, a shaft turnable relative thereto, a fixed housing about the body adapted to contain a supply of oil, a pump cylinder in the body, a plunger slidable in the cylinder, means to move the plunger in one direction, means functioning upon such movement to draw oil into the cylinder from the housing, means forming a restricted oil outlet passage from the cylinder back to the housing, means to move the plunger in the other direction to force the oil through said passage upon relative rotation of the body and shaft, an element movable to close the passage, manual means to move such element, and means formed with the element to cause oil pressure within the cylinder to maintain the element in passage closing position once it is moved to such position.

GEORGE E. THOMPSON.